United States Patent [19]

Straza

[11] 4,244,353
[45] Jan. 13, 1981

[54] SOLAR HEATING SHINGLE ROOF STRUCTURE

[76] Inventor: George T. Straza, 1071 Industrial Pl., El Cajon, Calif. 92020

[21] Appl. No.: 785,337

[22] Filed: Apr. 7, 1977

Related U.S. Application Data

[63] Continuation-in-part of Ser. No. 694,959, Jun. 11, 1976.

[51] Int. Cl.³ .................................................. F24J 3/02
[52] U.S. Cl. ..................................... 126/432; 126/448; 126/DIG. 2
[58] Field of Search ............... 126/270, 271, 432, 450, 126/448, 449, DIG. 2, 417; 237/1 A; 52/302, 303, 528, 533, 305, 543, 553, 518, 615

[56] References Cited

U.S. PATENT DOCUMENTS

| 2,469,496 | 5/1949 | Christenson | 126/271 |
|---|---|---|---|
| 2,624,298 | 1/1953 | Farren | 52/303 |
| 3,893,506 | 7/1975 | Laing | 126/271 |
| 3,996,918 | 12/1976 | Quick | 126/270 |
| 4,023,321 | 5/1977 | Smith | 52/750 |
| 4,080,955 | 3/1978 | Sandstrom | 126/444 |
| 4,082,082 | 4/1978 | Harvey | 126/448 |
| 4,141,338 | 2/1979 | Lof | 126/449 |

FOREIGN PATENT DOCUMENTS

| 257425 | 5/1963 | Australia | 126/271 |
|---|---|---|---|
| 2120345 | 4/1971 | Fed. Rep. of Germany | 126/432 |

*Primary Examiner*—James C. Yeung
*Attorney, Agent, or Firm*—Brown & Martin

[57] ABSTRACT

A solar heating roof shingle roof structure which combines the functions of a roof and a fluid conducting solar heating panel. Each shingle is a hollow body of the general size and configuration of a conventional shingle, and is provided with a fluid inlet socket at the upper end and a fluid outlet plug at the lower end with a skirt at the lower end overlapping the plug. Shingles are assembled in an overlapping array to cover a roof structure, with interconnections between the inlets and outlets of successive longitudinally positioned shingles to provide fluid paths through the complete array. An inlet manifold is positioned at the upper end of the array or in the alternative contained in a cap used at the peak of the roof and an outlet manifold is connected to the outlet of the lowest row of shingles.

24 Claims, 9 Drawing Figures

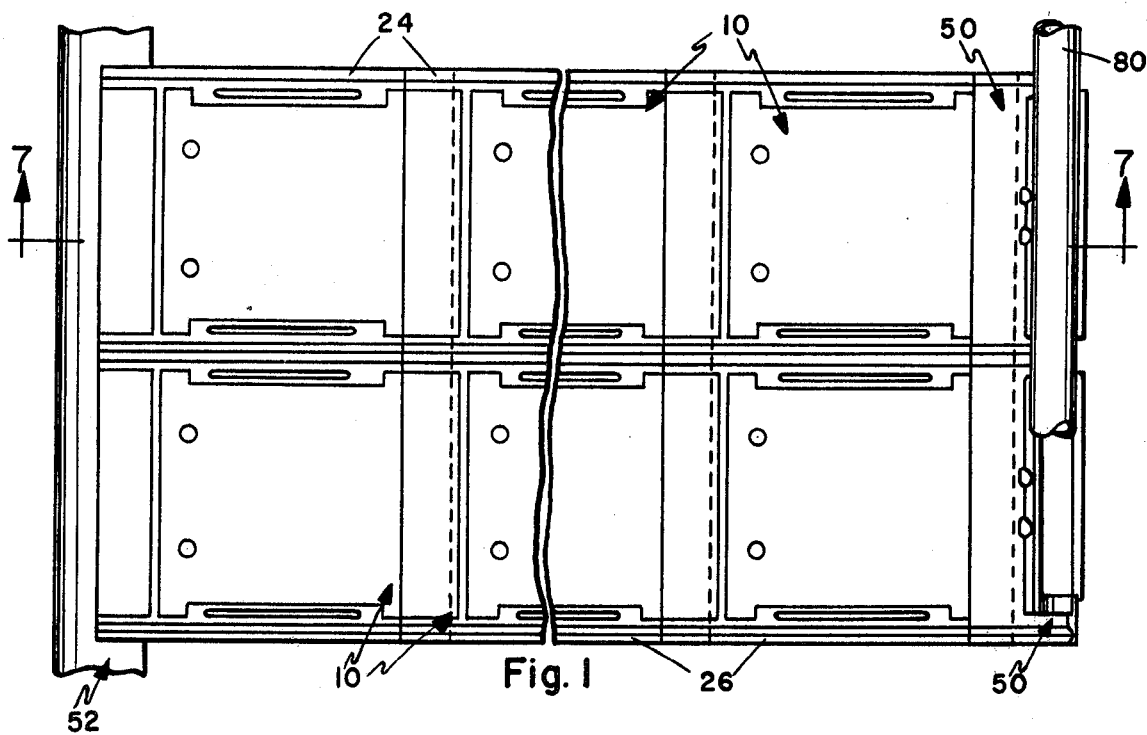
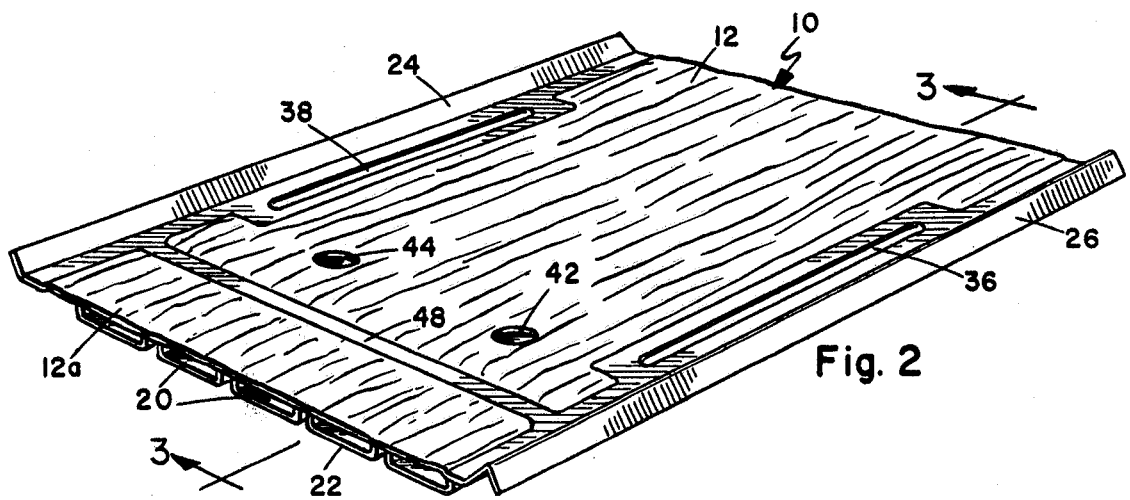
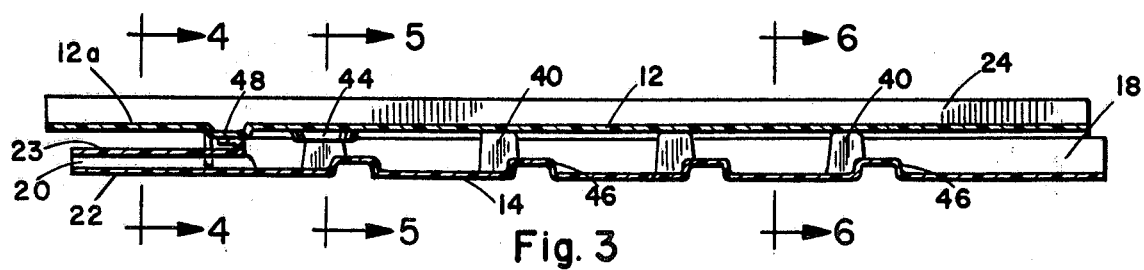
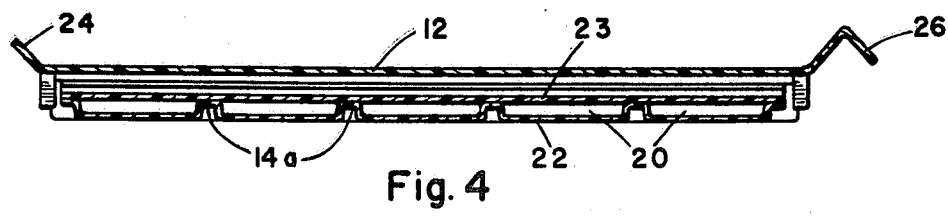

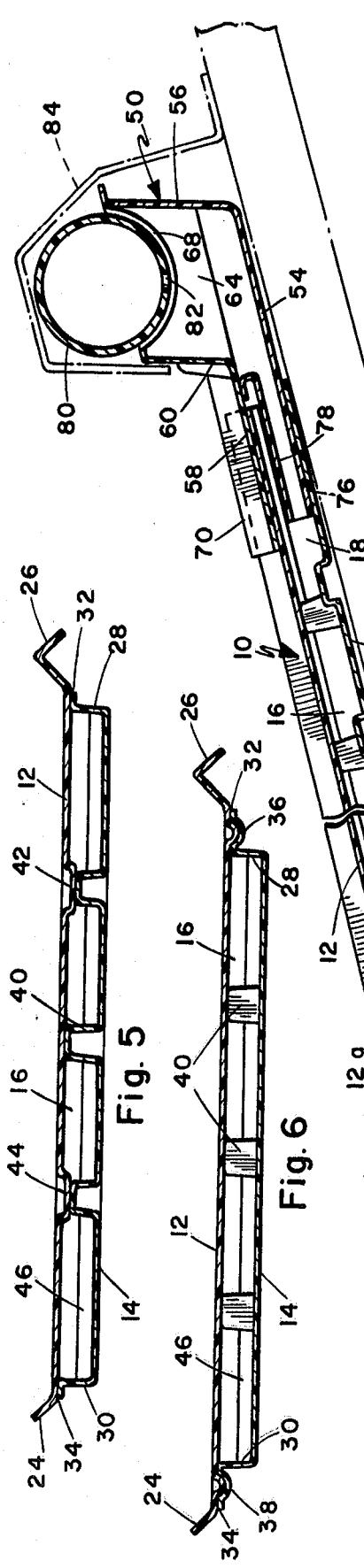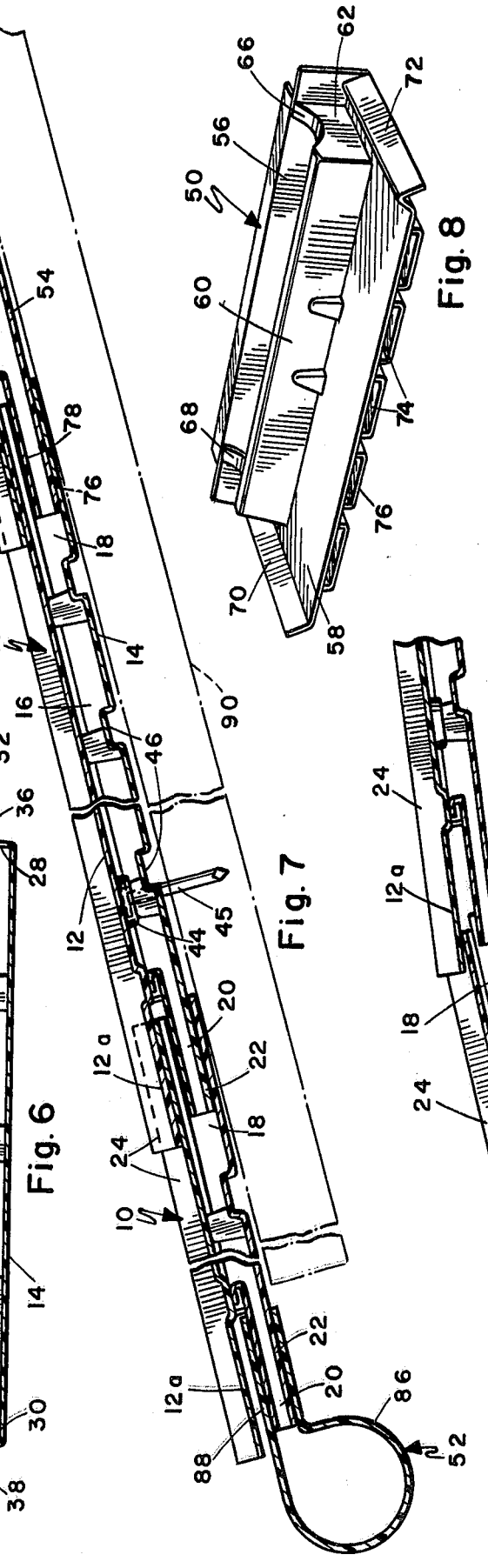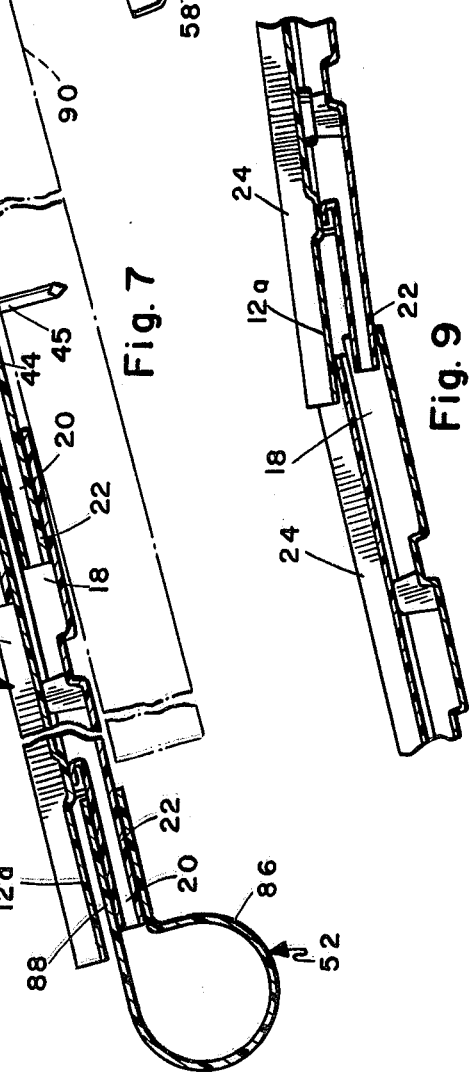

SOLAR HEATING SHINGLE ROOF STRUCTURE

REFERENCE TO RELATED APPLICATION

This application is a continuation-in-part of my co-pending application Ser. No. 694,959, filed June 11, 1976, entitled "Solar Heating Shingle Roof Structure."

BACKGROUND OF THE INVENTION

Roof mounted solar heating panels have been constructed in many different forms and are usually self contained units, which are attached on or inset in a portion of a roof. The cost of the panel structure is additional to the roof, and in many installations the roof structure does not provide an ideal support. When solar panels are applied to an existing building, they often detract from the appearance of the structure.

SUMMARY AND OBJECTS OF THE INVENTION

The structure described herein incorporates a fluid conducting solar heating panel into a shingled roof. Each individual shingle is a hollow body with the general size and configuration of a conventional roof shingle, and has at least one inlet and outlet for fluid flow through the interior along the length of the body. In the preferred form the shingles are assembled in an overlapping array, with plug type connectors incorporated in and defining the inlets and outlets of successive shingles. Each shingle is constructed of upper and lower sheets connected together along the side edges in a manner to define longitudinal stiffness. The lower sheet includes transverse stiffeners and fluid deflectors.

Each shingle has pillars extending between the upper and lower sheets at least some of which are adapted to receive nails for securing the shingle in a conventional manner without the danger of leakage. Fluid, such as water, is fed into the upper portion of the shingle assembly from an inlet manifold which may be contained in a cap, as normally used at the peak of a roof. An outlet manifold is connected to the outlets of the lowest row of shingles.

The shingles can be transparent, or made decorative in any suitable manner which will permit efficient heating of the fluid passing through. Various fluid flow and control systems may be used with the shingle installation, depending on the particular use for and type of fluid to be heated.

The primary object of this invention, therefore, is to provide a new and improved solar heating shingle roof structure.

Another object of this invention is to provide a roof structure of hollow, fluid conducting, interconnected shingles.

Another object of this invention is to provide a solar heating shingle roof with inlet and outlet manifolds incorporated into the basic roof structure.

A further object of this invention is to provide a solar heating shingle roof utilizing standardized shingles and connectors, which can be assembled to form partial or complete roof structures of any desired size.

BRIEF DESCRIPTION OF THE DRAWING

Other objects and advantages will be apparent in the following detailed description, taken in conjunction with the accompanying drawings, in which:

FIG. 1 is a top plan view of a portion of a typical roof structure of the invention.

FIG. 2 is a perspective view of a shingle of the invention.

FIG. 3 is an enlarged sectional view taken on line 3—3 of FIG. 2.

FIG. 4 is a sectional view taken on line 4—4 of FIG. 3.

FIG. 5 is a sectional view taken on line 5—5 of FIG. 3.

FIG. 6 is an sectional view taken on line 6—6 of FIG. 3.

FIG. 7 is an enlarged sectional view taken on line 7—7 of FIG. 1.

FIG. 8 is a perspective view of an inlet manifold section.

FIG. 9 is a sectional view similar to a portion of FIG. 7, showing the initial interconnection of two shingles.

DESCRIPTION OF A PREFERRED EMBODIMENT

Referring first to FIGS. 1 through 4 of the drawing, there is illustrated a roof structure constructed of a plurality of shingles in accordance with the invention. The individual shingles are such as illustrated in FIG. 2 and overlap in parallel longitudinally extending rows as illustrated in FIG. 1. The longitudinally extending rows are interconnected to provide fluid flow channels between an inlet manifold and an outlet manifold between channels defined by the shingle structure. This structure incorporates the principles of the parent application and provides an improvement thereover. In particular the present construction incorporates inlet socket and outlet plug arrangement of FIG. 8 of that application.

The roof structure as illustrated in FIG. 1, shows a plurality of shingles 10 connected end to end between the inlet and outlet manifolds, and overlapping adjacent rows of shingles to define a weather proof structure. The shingle as best seen in FIGS. 2 through 4 includes an upper panel or sheet 12 connected in spaced relation to a lower or bottom sheet 14 defining a flow passage or channel 16 between an upper inlet 18 defined by generally longitudinally and transversally extending rectangular socket and a lower outlet 20 defined by a generally longitudinally and transversally extending rectangular plug 22. The outlet plug 22 is downwardly and forwardly projecting and is designed to fit and seat firmly into a socket 18 of a down slope shingle.

The upper sheet or panel 10 includes an upwardly turned edge flange 24 extending longitudinally along one edge thereof in an inverted generally V-shaped cap flange 26 extending generally longitudinally along the opposite edge thereof. These flanges overlap adjacent shingles for providing a weather proof or weather tight roof structure.

The lower panel 12 as best seen in FIGS. 5 and 6 in the preferred embodiment includes upwardly extending side edges defining longitudinally extending side walls 28 and 30. The two panels 12 and 14 are preferably welded or bonded in a suitable manner along seams 32 and 34 between the side walls 28 and 30 and are under side of the upper panel 12. Longitudinally extending ribs 36 and 38 are also formed along adjacent the edges of the shingle structure at a position of connection between the upper and lower sheets or panels 12 and 14. These stiffening ribs or the like enhance the longitudinal strength of the shingle structure and serve to align the panels during assembly. Additional strengthening of the structure is provided by means of a plurality of pillars 40 extending between the upper and lower panels 12 and 14 as shown in FIGS. 5 and 6. These may be formed as shown in FIG. 5 by an inverted cup like projection extending upward from the lower panel or sheet 14.

Attaching or nailing pillars 42 and 44 are provided or formed as shown in FIG. 5. These pillars are preferably formed by an upwardly extending cup from the lower sheet 14 and downwardly extending cups from the upper sheet 12 meeting at a position just slightly below the plane of the upper sheet. This provides a sealed off portion from channel 16 for receiving a nail 45 or other suitable connecting means, for securing the shingle to a roof structure, as in FIG. 7. Thus, holes may be formed in the pillars or columns without causing leakage from the inside of the channel. The upper ends of the columns 40 are preferably secured to the underside of the upper sheet such as by welding or by a suitable bonding agent.

Turning now to FIG. 3 and, as also may be seen in FIGS. 7 and 9, the lower sheet or panel 14 is provided with transverse ribs or stiffeners 46 extending upward and transverse of the lower sheet or panel 14. These stiffeners also act as deflector ribs to throw heat conducting fluids such as water, against the under side of the top panel 12 for continuous washing of the underside thereof. This prevents moisture condensation or build up on the under side of the upper panel which would result in a reduction in the heat transmission therethrough. It likewise provides a continuous contact of the fluid or water with the under side of the upper panel. This tends to increase the heat transfer to the fluid medium.

As best seen in FIGS. 2 and 4, the outlet plug 22 includes an upper sheet 23 cooperating with and spaced upward from an extension of the lower sheet 14 for defining the outlet in the form of a plurality of outlet passageways 20 defined by a plurality of upwardly longitudinally extending stiffeners 14a which supports the sheet 23 and 14 in spaced relationship to maintain the outlet opening. This prevents collapse of the opening and possible cutting off of communication between a pair of interconnected shingles. The inner end of the sheet 23 is curved forward as shown in FIG. 3 and connected to the underside of sheet 12 at the transverse rib 48 which may also serve as a reinforcing rib or structure. This leaves a space between the upper surface of the plug 22 and the underside of sheet 12 defined by an extension thereof, referred to as a skirt 12a, for receiving the upper end of the upper sheet of a lower slope shingle. This skirt 12a overlaps the interconnection of the plug 22 with the down stream or downslope socket of a longitudinally connected similar shingle.

As best seen in FIG. 9, an outlet plug 22 fits within an inlet socket 18 at the upper end of a downstream shingle 10 with the skirt 12a of the upper panel or shingle 10 overlapping the upper end of the upper surface of the sheet 12. This insures a leak proof construction between upper and lower shingles. Thus with this shingle construction, longitudinally disposed shingles are fluid connected for passage of fluids therethrough. Adjacent rows of shingles are sealingly connected with overlapping flanges 24 and 26 to provide a leak proof roof structure.

The upper sheet or panel 12 is preferably of a transparent durable material such as a suitable plastic, and the lower sheet 14 is preferably of a non-transparent durable material preferably black in color. Alternately the lower panel or sheet 14 may also be transparent and a black supporting surface provided beneath it for absorbing the solar radiation applied thereto.

As best seen in FIGS. 1, 7, and 8, the shingles are designed to interconnect with an upper inlet manifold designated generally by the numeral 50 and a lower outlet manifold designated generally by the numeral 52. The inlet manifold comprises a generally open channel or trough member with a lower sheet 54 defining the bottom thereof and including an upturned portion defining an upper end or wall 56. An upper sheet 58 extends to form a lower end wall 60 of the channel and includes side walls 62 and 64 with arcuate shaped support or saddle portions 66 and 68 respectively. The sheet 58 also includes an edge flange 70 and cap flange 72 similar to those on the shingles.

The upper manifold 50 includes an inner channel defined by the above structure which communicates with an outlet 74 defined by a plug 76. The plug 76 includes a lower wall defined by the sheet 54 and an upper wall defined by an additional sheet 78, similar in function to sheet 23. These sheets are interconnected by means of ribs or longitudinal stiffness similar to those in the outlet of the shingle as shown in FIG. 4. This defines a plurality of outlet channels or openings 74 for communicating with the inlet socket at the upper end of a shingle 10. The upper sheet 58 also defines a skirt overlapping the upper end of the shingle 10 and likewise extending beyond the connection thereof with the plug and socket members. The channel 50 receives a conduit member 80 which rests within the support or saddle member 66 and 68. The conduit 80 may simply rest on the support structure or be secured thereto by suitable clamping or fastening means such as gluing.

Communication between the interior of the conduit 80 and open channel of the manifold 50 is accomplished by suitable ports or openings 82 in the lower wall of the conduit 80 to permit a fluid such as water, flowing along the conduit 80 to pour into the manifold and to communicate along the passageway defined by a longitudinally series of interconnected shingles. The fluid communicated thereto passes through the shingles and is heated by solar energy directed thereto before it reaches the outlet manifold 52. The inlet manifold 50 may be covered by a suitable cap member 84. This cap member may be disposed in any position on the roof or it may be at the ridge line of the roof.

The outlet manifold 52 comprises a generally tubular elongated member 86 having an inlet socket 88 extending from one side for receiving the outlet plugs 22 of shingles connected thereto. Again the skirt 12a of a shingle connected thereto overlaps the plug and socket interconnection between the shingle and the outlet manifold 52.

The structure herein is designed to be primarily a gravity flow system. Therefore the system would be mounted in an inclined fashion as shown in FIG. 7 on a sloping roof or support structure shown in phantom at 90. This structure may be a sub-roof with the shingle structure of the present invention defining the actual roof itself. Thus, the expense of a separate roof is avoided. The present construction is designed to serve as the actual roof structure itself as well as the solar energy collector. Thus with initial installations at the new sites the cost of the solar energy collecting system may be comparable to or only nominally above that of a conventional roof. The roof structure is also designed to blend into and/or simulate that of a shingle roof. In this regard the upper surface of the respective shingles may be formed with suitable decorative or granular grained patterns to simulate wood shingles or the like.

While the present invention has been illustrated and described by means of specific embodiments, it is to be understood that numerous changes and modifications may be made therein without departing from the spirit and scope of the invention as defined in the appended claims.

Having described my invention, I now claim:

1. A solar heating shingle roof structure, comprising:
   a plurality of parallel rows of longitudinally interconnected and laterally overlapping fluid conducting shingles having means for attachment to a roof structure,
   each shingle comprising a hollow body of substantially rectangular, thin, flat configuration, having an upper sheet defining an upper surface, a lower sheet defining a lower surface, laterally spaced side walls defining side surfaces, an upper transverse edge and a lower transverse edge, said upper and lower sheets and said side walls being spaced apart and defining a fluid flow passage therebetween,
   each shingle having at least one fluid inlet defined by socket means adjacent the upper edge having substantially the same width as said fluid flow passage and at least one fluid outlet defined by plug means adjacent the lower edge thereof communicating with said flow passage,
   and said plug and socket means interconnecting the inlets and outlets of longitudinally adjacent overlapping shingles.

2. A solar heating shingle roof structure according to claim 1, wherein said means for attachment comprises a solid portion between the upper and lower sheets of the shingle, for receiving nail holes therethrough.

3. A solar heating shingle roof structure according to claim 1, and including an inlet manifold connected to the inlets of the row of shingles at the upper edge of the structure,
   and an outlet manifold connected to the outlets of the row of shingles at the other edge of the structure.

4. A solar heating shingle roof structure according to claim 3, wherein said outlet manifold comprises conduit means having a plurality of inlet socket means for connecting to said outlet sockets of the row of shingles at said other edge of the structure.

5. A solar heating shingle roof structure according to claim 1, wherein each shingle includes a skirt overlapping the interconnection between longitudinally interconnected panels.

6. A solar heating shingle roof structure according to claim 5, wherein,
   said plug and said socket extend longitudinally of said shingle, and said outlet opening is substantially the same width as said flow passage,
   each of said shingles include a cap flange overlapping a flange on an adjacent shingle,
   transverse rib means extending across said flow passage for directing said fluid along said passage upward against the underside of said upper sheet, and,
   a plurality of pillars extending between said upper and said lower sheets for supporting said sheets in spaced apart relationship.

7. A solar heating shingle roof structure according to claim 1, wherein said plug and said socket extend longitudinally of said shingle.

8. A solar heating shingle roof structure according to claim 1, wherein said outlet openings are substantially the same width as said flow passage.

9. A solar heating shingle roof structure according to claim 1, wherein each of said shingles includes a cap flange overlapping a flange on an adjacent shingle.

10. A solar heating shingle roof structure according to claim 1, comprising transverse rib means extending across said flow passage for directing fluid flowing along said passage upward against the underside of said upper sheet.

11. A solar heating shingle roof structure according to claim 10, including a plurality of pillars extending between said upper and said lower sheets for supporting said sheets in spaced apart relationship.

12. A solar heating shingle roof structure, comprising:
    a plurality of parallel rows of longitudinally interconnected and laterally overlapping fluid conducting shingles having means for attachment to a roof structure,
    each shingle comprising a hollow body of substantially rectangular, thin, flat configuration, having an upper sheet defining an upper surface, a lower sheet defining a lower surface, an upper transverse edge and a lower transverse edge, said upper and lower sheets being spaced apart and defining a flow passage therebetween,
    each shingle having at least one fluid inlet defined by socket means adjacent the upper edge and at least one fluid outlet defined by plug means adjacent the lower edge thereof communicating with said flow passage,
    and said plug and socket means for interconnecting the inlets and outlets of longitudinally adjacent overlapping shingles,
    an inlet manifold connected to the inlets of the row of shingles at the upper edge of the structure,
    and an outlet manifold connected to the outlets of the row of shingles at the other edge of the structure, said inlet manifold comprising an upwardly opening channel,
    a conduit supported by said channel above the opening thereof, and at least one opening in the wall of said conduit communicating with said opening.

13. A solar heating shingle roof structure according to claim 12, wherein said inlet manifold includes an outlet defined by plug means for connecting into the socket means of a shingle, and
    skirt means for overlapping the connection of said plug means with the socket of a shingle.

14. A solar heating roof shingle adapted for longitudinal fluid interconnection with a like shingle, comprising:
    a hollow body of substantially rectangular, thin, flat configuration having an upper surface defined by an upper sheet, a lower surface defined by a lower sheet, side surfaces defined by longitudinally extending side walls, an upper end, and a lower end, and a fluid passageway defined between said upper, lower, and side surfaces and extending between said ends,
    said body having at least one fluid inlet defined by a longitudinally extending socket in the upper end having substantially the same width of said fluid passageway, and at least one fluid outlet defined by a longitudinally extending plug in the lower end thereof, and means in said body for attachment to a roof structure.

15. A solar heating roof shingle according to claim 14, wherein said socket is a generally rectangular opening in said upper end, and said outlet is a corresponding generally rectangular opening in the plug in the lower end.

16. A solar heating roof shingle according to claim 14, wherein said socket extends longitudinally of said shingle, and said plug extends longitudinally from said lower surface.

17. A solar heating roof shingle according to claim 16 including transverse ribs in said fluid passageway for directing fluid in said passageway against said upper sheet.

18. A solar heating roof shingle according to claim 16, including a plurality of support columns extending between said upper and lower sheets.

19. A solar heating roof shingle according to claim 18, wherein said columns are inverted cup shaped members extending from said lower sheet to said upper sheet.

20. A solar heating roof shingle according to claim 14, wherein said attachment means comprises a solid portion of the body extending between the upper sheet and said lower sheet.

21. A solar heating roof shingle according to claim 17, including longitudinally extending reinforcing ribs extending along adjacent the side edges of said body.

22. A solar heating roof shingle according to claim 16, wherein said upper sheet includes a skirt portion overlapping said plug.

23. A solar heating roof shingle according to claim 22, wherein said plug includes longitudinally extending ribs dividing said outlet plug into a plurality of outlet openings.

24. A solar heating roof shingle according to claim 23, including a cap flange extending longitudinally along one side edge of said shingle for sealingly overlapping a flange on an adjacent shingle.

* * * * *